(No Model.) 2 Sheets—Sheet 1.

C. SPERRY.
SPEED INDICATOR AND REGISTER.

No. 372,875. Patented Nov. 8, 1887.

WITNESSES:

INVENTOR:
C. Sperry
BY Munn & Co.
ATTORNEYS.

(No Model.) 2 Sheets—Sheet 2.
C. SPERRY.
SPEED INDICATOR AND REGISTER.

No. 372,875. Patented Nov. 8, 1887.

WITNESSES:

INVENTOR:
C. Sperry
BY Munn & Co.
ATTORNEYS.

UNITED STATES PATENT OFFICE.

CHARLES SPERRY, OF NEW YORK, N. Y.

SPEED INDICATOR AND REGISTER.

SPECIFICATION forming part of Letters Patent No. 372,875, dated November 8, 1887.

Application filed January 22, 1887. Serial No. 225,103. (No model.)

*To all whom it may concern:*

Be it known that I, CHARLES SPERRY, of the city, county, and State of New York, have invented a new and useful Logometer, of which the following is a full, clear, and exact description.

My invention relates to improvements to be attached to and operated by my speed-indicator for vessels, forming the subject of my application for Letters Patent, filed November 24, 1886, Serial No. 219,761; and the objects of my improvements are to provide registering mechanism, to be operated and regulated by time mechanism indicating uniform time, in combination with the speed-indicating mechanism, the register showing the distance that the vessel to which the instrument is attached has covered since the time of starting, thereby composing a complete "logometer" to constantly indicate uniform time, the speed of, and the distance run by the vessel. I accomplish these objects by the mechanism illustrated in the accompanying drawings, in which—

Figure 1:
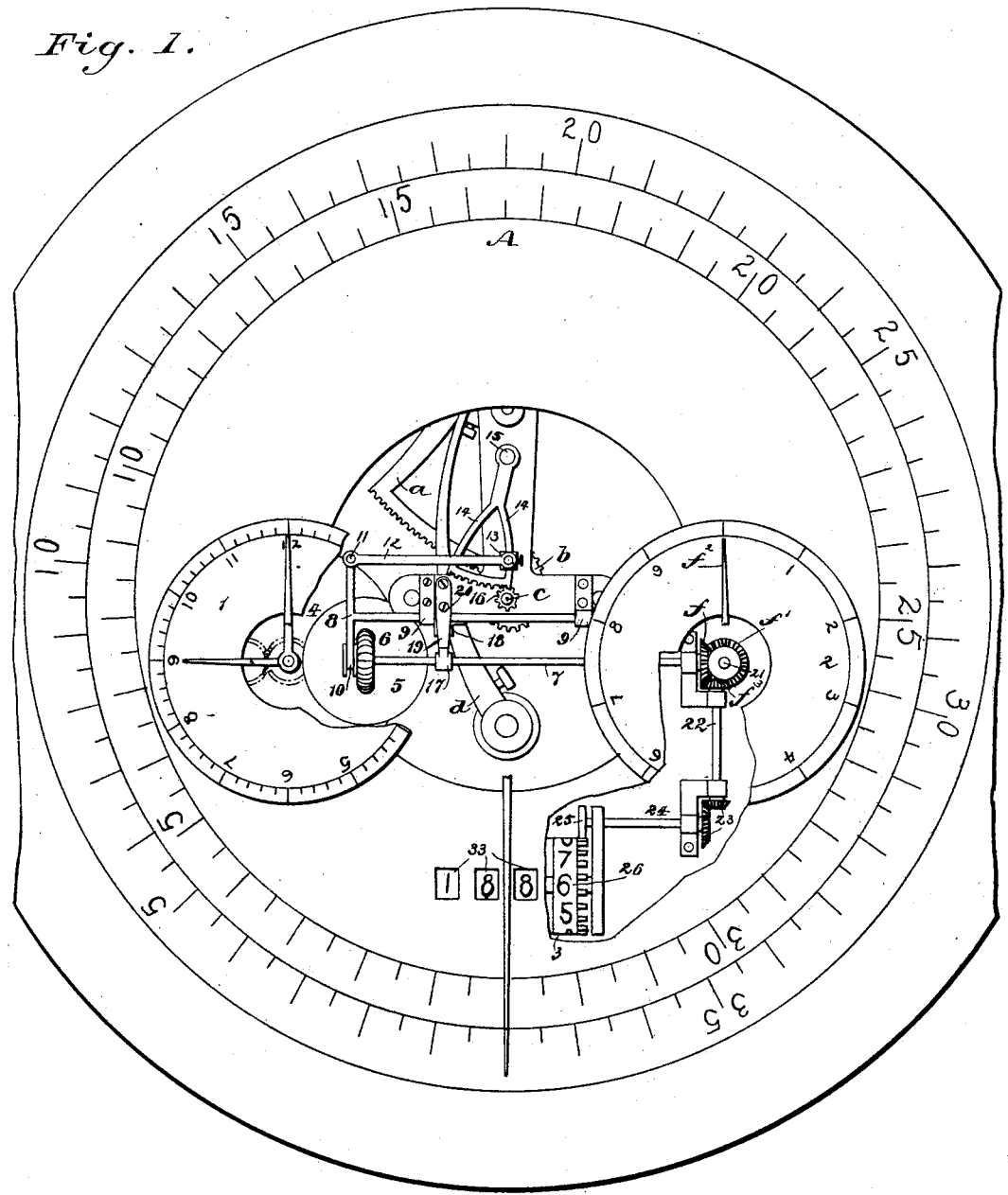
Figures 2, 3, 4, 5:
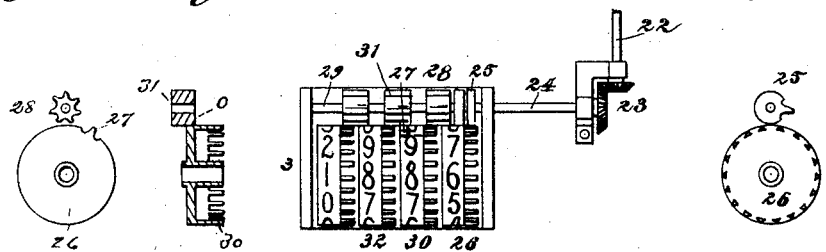

Figure 1 is a front view of the logometer with portions of its dial broken away, showing my improvement applied thereto. Fig. 2 is a front view of the counter removed from the case. Fig. 3 is a longitudinal cross-sectional view of one of the number-wheels and a pinion. Fig. 4 is an end view of one of the number-wheels and a pinion, and Fig. 5 is an end view of the first number-wheel and the single-tooth wheel of the counter.

Similar figures refer to similar parts throughout the several views.

A represents the dial, $a$ the toothed sector, $b$ the scroll-gear, $c$ the pointer-arbor, and $d$ the curved operating-arm of my speed-indicator, fully described in my above-mentioned application.

1 and 2 are small dials, graduated on the large dial-plate A of the instrument. Dial 1 is graduated in measures of time, and dial 2 in measures of length, (knots in this instance.) The circuit of dial 2 represents one knot, and the graduations are fractions of one knot.

3 is a counter, showing the aggregate number of knots which the vessel has sailed since a certain time—say the time the vessel started on her voyage.

4 represents a chronometer or clock-work, which moves the pointer over dial 1, indicating time. This clock-work revolves a disk, 5, at a certain regular rate of speed.

6 is a friction-wheel perpendicular to and in contact with the face of disk 5. This disk may be faced with rubber to increase the friction, and wheel 6 is thereby revolved whenever it is moved from the center of and across the face of disk 5.

Transversely to and in the circumference of rim of wheel 6 are disks which roll on the face of disk 5 to allow wheel 6 to be moved easily across its face with little friction and to increase the friction in the direction which disk 5 tends to revolve wheel 6. When wheel 6 is revolved, it turns a shaft, 7; and to permit it to be moved from and to the center of disk 5 the wheel 6 is made to slide on shaft 7.

8 is a shifter sliding in the guides 9. One arm of this shifter works in a groove, 10, on the hub of the wheel 6. The other arm is connected by a pin, 11, to a link, 12, and this link connects with a slide, 13, on one of the curved arms of the sector 14, which turns on a pivot, 15. The slide 13 may be moved on the curved arm to adjust the registering mechanism—viz., the mechanism for revolving the pointer $f^2$ and the disks of the counter 3—the curve of this arm being concentric with pin 11 and bisecting arbor $c$ when the speed-indicating pointer is at the zero-point. Sector 14 gears with a pinion, 16, which is fast on the arbor $c$ of the speed-indicator.

The bearing 17 of shaft 7 is pivoted at 18, so that the friction-wheel on the shaft may be pressed against the disk 5 by a spring, 19. The pressure, and consequently the friction, between disk 5 and wheel 6 may thereby be made more or less by turning a screw, 20, down or up and adjusting it to the proper amount, which will be just enough to revolve wheel 6 without its slipping on the face of the disk 5. The bevel-gear $f$ on shaft 7 turns the bevel-gear $f'$ on a shaft, 21, on which is the pointer $f^2$ of dial 2. The gear on shaft 7 also revolves the bevel-gear $f^3$ on a shaft, 22, which, by the bevel-gears 23, revolves a shaft, 24. On the end of shaft 24, which has a bearing in the counter 3, is a wheel, 25, having one tooth, which at every revolution enters between the teeth on a number-wheel, 26, which it turns two teeth, equal to a tenth of a revolution.

The circumference of wheel 25, entering between two teeth on wheel 26, serves as a stop or lock to that wheel while the tooth of wheel 25 is out of operation. At every revolution of wheel 26 a single tooth, 27, on its circumference turns a pinion, 28, two teeth. This pinion is loose on a shaft, 29, and gears with the second number-wheel, 30, and thereby turns that wheel two teeth, or one-tenth of a revolution. When tooth 27 leaves pinion 28, the circumference of wheel 26 enters between the teeth of the pinion, thereby locking it and wheel 30. At every revolution of wheel 30 the pinion 31 and the third number-wheel, 32, are revolved two teeth and locked in the same manner as described for pinion 28 and wheel 30. Additional number-wheels are revolved in a similar way. Equidistant apart on the circumferential faces of the number-wheels are the numerals 0, 1, 2, 3, 4, 5, 6, 7, 8, 9, which appear in their regular order through apertures 33 in the dial-plate alternately with each movement of the wheel. The drawings show four number-wheels, which will register, count, or number from one up to ten thousand knots; but more or less number-wheels may be used, as desired.

The operation will be as follows: The time mechanism, running regularly, indicates uniform time on dial 1 and revolves the disk 5 continuously at a regular speed. As long as the speed-indicating pointer remains at its zero-point, the friction-wheel 6 will remain on the center of disk 5, and consequently will not revolve, and the registering mechanism—viz., the mechanism for moving the pointer $f^2$ and the mechanism of the counter 3—will remain at rest. When the speed-indicator moves around the large dial A, the pinion 16 on its shaft moves the sector 14, and this, by link 12 and shifter 8 in the groove 10, moves the friction-wheel 6 from the center of disk 5. Wheel 6 will be revolved at a speed directly in proportion to its distance from the center of the face of disk 5, and this distance will be directly in proportion to the distance which the speed-pointer has moved around the large dial. When wheel 6 is revolved, it turns shafts 7 and 21 with the pointer of dial 2, making one revolution for each knot the vessel runs. Shaft 7, also, through shaft 22, revolves shaft 24 the same number of revolutions. At each revolution of shaft 24 the first number-wheel, 26, is revolved two teeth, or one-tenth of a revolution, equal to the space occupied by one figure on its circumference. The figures appearing in the apertures in the dial-plate indicate the number of revolutions or knots. When wheel 26 has been revolved until the figure 9 is opposite to the aperture in the dial, tooth 27 reaches pinion 28, and with the next movement of wheel 26 the second number-wheel, 30, is revolved one space, registering the tens. When the figure 9 on wheel 30 reaches the aperture in the dial-plate, the next movement revolves the third number-wheel, 32, one space, registering the hundreds. Other number-wheels are revolved in the same manner. When it is desired to bring the ciphers in view, the pinions on shaft 29 are moved out of gear with the number-wheels by moving shaft 29 from the number-wheels, which may then be placed as desired.

The registering mechanism—viz., that which moves the pointer $f^2$ and the counter 3—is regulated by moving the slide 13 on the curved arm 14 to a position that will cause the time mechanism to move the pointer around dial 2, as described, an equal number of revolutions per hour, as the speed indicated on the large dial—that is, if the speed-pointer points to ten knots for one hour, the pointer of dial 2 will make ten revolutions in that hour, and the counter will show the figures 10 at the end of the same time. The data obtained by the logometer is, therefore, the speed of the vessel per hour, indicated on the large dial; uniform time, on dial 1; number of knots run, by the counter 3, and the fraction of a knot, on dial 2.

I do not limit myself to the exact construction of the parts as illustrated in the drawings and herein described, as the same can be varied as may be required.

Having thus fully described my invention, I claim as new and desire to secure by Letters Patent—

1. The combination, with the pointer-arbor $c$, the pinion therein, the segment-rack 14, a chronometer and rotating plate 5, connecting-rod 12, arm 8, and friction-wheel 6, of the shaft 7, gear-wheels $f f'$, for turning pointer $f^2$, and the shaft 22 24, gear-wheels 23, and counting device 38, substantially as described.

2. The pointer-arbor $c$ and pinion thereon, in combination with segment-rack 14, rod 12, adjustably connected to the segment-rack, and arm 8, revolving disk 5, and the friction-wheel 6, substantially as and for the purposes set forth.

3. The arbor $c$ of the speed-indicator, provided with the pinion 16, in combination with the sector 14, shifting device 8, connected thereto, the chronometer mechanism, the friction-disks 5 and 6, shafts 7 and 24, gear-wheels $f, f'$, and 23, and the counter 3, substantially as described.

CHARLES SPERRY.

Witnesses:
H. A. WEST,
EDGAR TATE.